May 19, 1942.    A. REGENBRECHT    2,283,228
PROCESS AND APPARATUS FOR BURNING SULPHUR
Filed Dec. 23, 1939
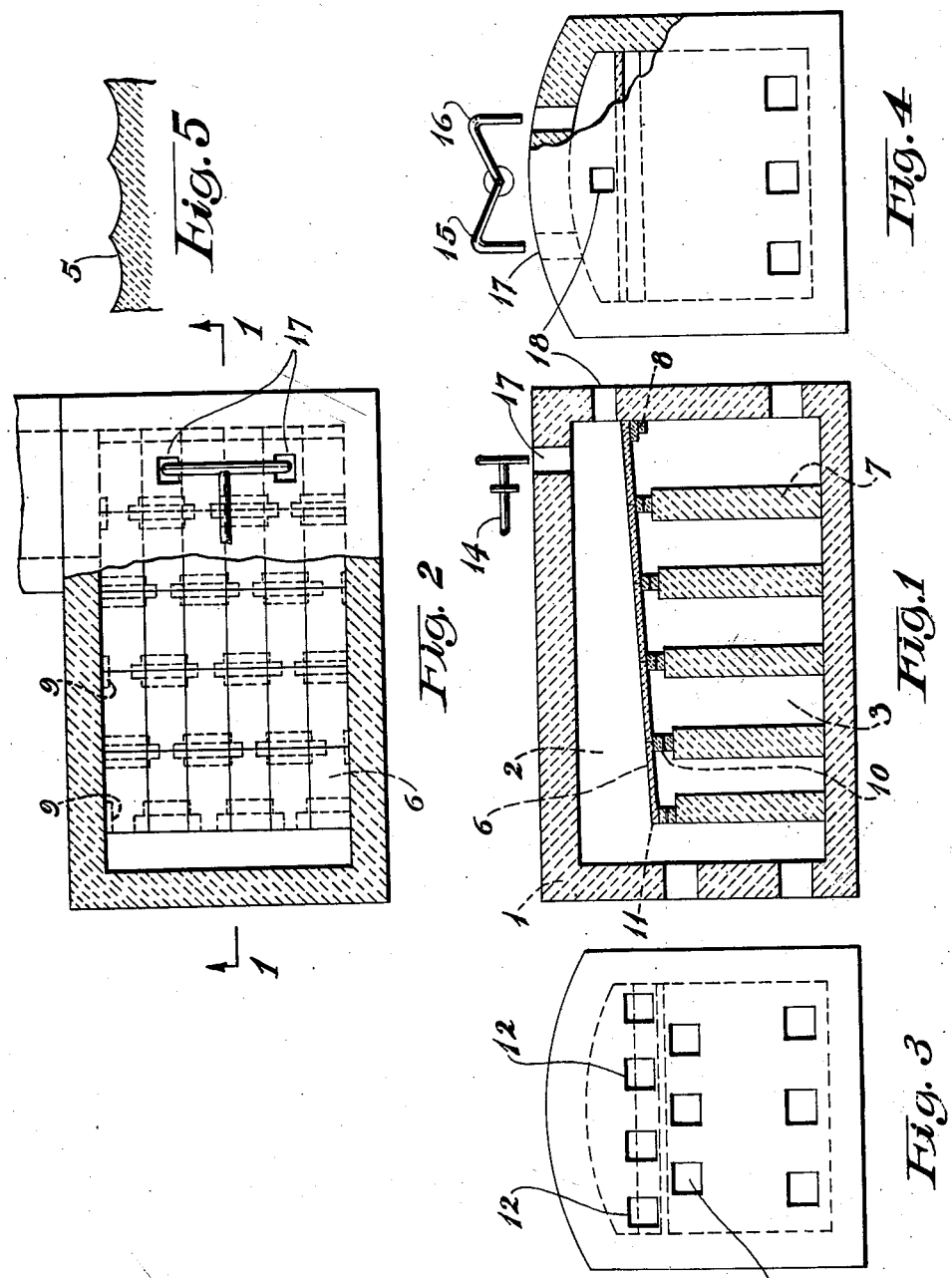
Albert Regenbrecht INVENTOR
BY George T. Johannesen
ATTORNEY Patented May 19, 1942

2,283,228

UNITED STATES PATENT OFFICE 2,283,228

PROCESS AND APPARATUS FOR BURNING SULPHUR

Albert Regenbrecht, Linden, N. J., assignor to E. I. du Pont de Nemours & Company, Wilmington, Del., a corporation of Delaware Application December 23, 1939, Serial No. 310,815

9 Claims. (Cl. 23—179)

This invention relates to the manufacture of sulphur dioxide gases suitable for use in the manufacture of sulphuric acid and particularly relates to methods and apparatus in which sulphur is volatilized on an inclined hearth by indirect heat exchange with the combustion of the volatilized gas.

Sulphur burners may in general be classified as pan burners, film burners, and spray burners. In the pan burners, as the name implies, a shallow pan of cast iron, earthenware, tile or firebrick provides a hearth in which sulphur is melted and at least partially burned, the vapors passing in admixture with air into a combustion zone where more complete combustion is effected. In some cases molten sulphur is introduced into the pans and in others multiple arrangements of hearths are employed. In the film type burner, as exemplified by the Glenns-Falls burner, molten sulphur is held in a rotary cylinder the rotation of which causes the formation on the inner surface of the cylinder of a film of molten sulphur which facilitates rapid burning and volatilization of the sulphur. In the third type molten sulphur is atomized directly into a combustion zone.

The pan burners are not well adapted to maintaining a uniform concentration of $SO_2$ in the burner gas. Impurities in the sulphur rise to the surface, forming an incrustation of slag which gradually retards combustion and reduces the $SO_2$ concentration of the burner gas. On periodic removal of this incrustation the sulphur dioxide concentration of the burner gas jumps up with the rate of combustion. Non-uniform combustion also occurs whenever it is necessary to burn out the pans or hearths. The pan burners offer a still more serious difficulty in that if the draft should fail or if it should become necessary because of an emergency to shut down the system sulphur vapors permeate thruout the system and deposit what is known in the art as sublimed sulphur.

The Glenns-Falls burners, while better adapted to the maintenance of uniform sulphur dioxide concentration, require moving parts and are expensive to operate. Moreover, they are subject to the disadvantages previously noted in regard to sublimed sulphur.

Systems in which atomized sulphur is projected directly into a combustion zone offer disadvantages in the construction and maintenance of suitable atomizing nozzles. Impurities in the sulphur tend to clog the atomizing jet and highly specialized apparatus is required to avoid this difficulty. Moreover, melting pits and a complex system of pumps is required to supply molten sulphur under pressure to the atomizing jets.

This invention has for its object the avoidance of the disadvantages of the prior art. An object of the invention is to provide methods and apparatus for burning sulphur which are capable of maintaining uniform sulphur dioxide concentrations in the burner gases. Another object is to provide methods and apparatus for burning sulphur which are not dependent upon moving parts and which require relatively little power to operate. A still further object is to provide methods and apparatus which may be shut down at any time without causing the system to become charged with sulphur vapor. Still another object is to provide relatively inexpensive and easily constructed apparatus having high capacity for the production of sulphur dioxide per unit space. Further objects will appear hereinafter.

These objects are accomplished by the present invention in which molten sulphur is caused to flow down in a relatively thin film over a sloping hearth and to be evaporated and volatilized therefrom by indirect heat exchange with the combustion gases. Suitable apparatus for carrying out the invention is illustrated in the accompanying drawing in which Figure 1 represents a side elevation in section, Figure 2 is a plan view in a partial section, Figure 3 is an end view, Figure 4 is a view of the opposite end with parts broken away to show interior detail, and Figure 5 is an enlarged detail section taken along line 1—1.

The furnace housing 1, as shown in the drawing, may be of any conventional construction and I have found that the usual brick construction utilized in connection with pan burners is entirely satisfactory. This housing provides a rectangular chamber which is divided into a volatilization chamber 2 and a combustion chamber 3 by means of the hearth 4. The hearth 4 is essentially a plane surface, or preferably a plane surface for the upper half and with shallow transverse corrugations 5 in the lower half, constructed of refractory material, preferably of high heat conductivity such as Carborundum and Alundum. It is inclined slightly to the horizontal, suitably at an angle of one or two degrees and preferably not greater than three degrees.

As best seen in Figures 1 and 2, the hearth or shelf 4 is constructed of a plurality of Carbofrax (Carborundum) tiles 6, supported by a plurality of pillars 7, coupled with projections from the walls of the housing 1 as shown at 8 and 9. The actual point of contact between the supports and the tiling is made as small as possible, as for example by the bricks 10, in order to expose as much as possible of the surface of the tile to the action of the hot combustion gases. The columns or pillars 7 preferably are staggered as shown in Figure 2 in order to promote intimate mixing of sulphur vapor and air in the combustion chamber 3 whereby to promote effective heat exchange between the combustion chamber and the volatilization chamber 2.

The shelf 4 is spaced from one wall of the furnace housing 1 in order to permit the volatilized sulphur vapor to pass into the combustion zone. As shown in the drawing, the lowermost end 11 of the shelf is so spaced. Directly opposite this end of the shelf the end wall of the housing 1 is provided with a plurality of air ports 12 and 13. The ports 12 are located slightly above the edge of the shelf 4 and the ports 13 are located slightly below whereby air is admitted to the sulphur vapor as it passes from above the shelf 4 to below the shelf. In this manner mixing of the two gases, namely, air and sulphur vapor, is promoted and, moreover, air is admitted at a point where it is most desired that intensive combustion shall begin.

In the operation of the sulphur burner described above sulphur is introduced at two points near the upper end of the shelf 4 by means of a steam jacketed pipe 14 which has two nozzles 15 and 16 at its end adapted to feed molten sulphur to the hearth thru the apertures 17 in the roof of the furnace housing 1. These nozzles may be adjusted so that the flow of sulphur to the shelf 4 may be adjusted as desired. It is desirable that the molten sulphur be delivered to the nozzles 15 and 16 at a uniform and constant pressure since the uniformity of gas strength produced is dependent upon the uniformity of the rate of sulphur feed. Dry sulphur may also be fed directly to the shelf 4 and melted down directly thereon by the heat of combustion. This has the advantage that sulphur melting and molten sulphur storage and transfer mechanisms are eliminated, but requires greater shelf area per unit sulphur dioxide production.

Uniform distribution of sulphur on the shelf 4 is obtained by taking advantage of differences in viscosity of liquid sulphur at different temperatures. Thus, the sulphur fed to the burner is only slightly above the melting point, for example, at 125 to 130° C. and preferably not above 145° C., and at these temperatures the sulphur is a fluent liquid which flows easily and spreads over the surface of the shelf 4 in a thin film. As the sulphur flows down the shelf and the temperature increases it becomes very viscous and the rate of flow is decreased so that a dam of viscous sulphur is built up across the hearth. Behind this dam the fluent sulphur is distributed in a very shallow pool. As this viscous sulphur moves slowly down the inclined shelf it is heated still more and again becomes a fluent liquid which runs down the shelf in a thin film which evaporates from the heat supplied by combustion. In this manner the sulphur itself is utilized to effect uniform distribution over the shelf. Thus, though the sulphur is constantly moving down the hearth the zone of restricted flow forms in effect a stationary dam which uniformly distributes the sulphur introduced over the surface of the shelf and acts as a means to feed sulphur in a uniform film over that portion of the shelf where rapid volatilization takes place.

As the sulphur vapor is formed it follows the shelf to the end where it meets the incoming air. Since this end of the shelf is near the front wall of the burner 1 there is provided a restricted orifice thru which the sulphur vapor flows into the combustion chamber 3. This causes the sulphur vapor to meet the incoming air at high velocity which, coupled with the change in direction of the gases gives good initial mixing.

The admission of air should be fairly uniform along the entire edge of the shelf. No control is required at the air ports, however, since the volume of air admitted is regulated entirely by the volume of gas removed from the burner. The air ports 10 and 11, however, should not be so large that sulphur vapor will leave the furnace and should not be so small or so few that any substantial proportion of the air is supplied thru the suphur inlet openings 15 or the clean-out port 18. Those skilled in the art from the considerations given will readily be able to determine the proper number, size, and location of the air ports and will also be able by obstructing one or more of the ports, including the clean-out port 18, by means of bricks or other obstructions to regulate and distribute the admission of air as required. Thus, it may be desirable in some cases to admit more air at one side than at the other in order to modify the distribution of heat under the shelf 4, or to increase or decrease the amount of air admitted directly into the volatilization chamber 2 as thru the ports 17 and 18.

While I have described my invention with reference to the particular modification illustrated in the accompanying drawing, it will be understood that numerous variations and modifications thereof capable of accomplishing substantially the same results may be made and that such variations as do not depart from the spirit and scope of my invention are to be included within the appended claims.

I claim:

1. In a method of burning sulphur in a sulphur burner having a volatilization zone and a combustion zone in heat transfer relation through a common wall the steps of vaporizing sulphur in the vaporization zone, passing the sulphur vapor thus obtained into the combustion zone through a passageway in said common wall substantially co-extensive in length with the width of said common wall and in a manner such that there is a reversal in the direction of flow of the sulphur vapor as it passes from one zone into the other zone, causing air to be drawn into the sulphur vapor through ports adjacent said passage so located that the direction of flow of air through said ports is substantially normal to the direction of flow of sulphur vapor as it passes through said passageway whereby a degree of turbulence is obtained which promotes intimate mixing of the air and sulphur vapor.

2. The process of burning sulphur which comprises feeding molten sulphur at a temperature below that at which it is viscous to the upper end of a flat, slightly sloping hearth, permitting said sulphur to flow down over said hearth and heating said sulphur during said flow until it becomes viscous and forms a relatively thick dam of slow-moving viscous sulphur further heating said dam of viscous sulphur so that sulphur at its leading edge again becomes fluent and flows away in a thin film and vaporizes, so that the leading edge of the zone of viscous sulphur remains substantially stationary.

3. The method of claim 2 in which the sulphur is heated by burning the sulphur vapor in proximity thereto.

4. In a process of burning sulphur the step of continuously causing molten sulphur while fluent at a temperature near its melting point to spread over the surface of a substantially flat, stationary, heated vaporizing hearth inclined to the horizontal at a minor angle sufficient to cause the sulphur slowly to flow down the hearth and applying heat to the molten sulphur in a manner such that it is progressively heated as it flows down the hearth and eventually is vaporized, the conditions being such that the sulphur flows down the hearth and the temperature increases it becomes very viscous and the rate of flow is decreased so that a dam of viscous sulphur is built up across the hearth behind which the fluent sulphur is distributed in a shallow pool and such that as the viscous sulphur flows slowly down the hearth it is heated still more and again becomes a fluent liquid which runs away in a thin film and evaporates whereby, though the sulphur is constantly moving down the hearth, a zone of restricted flow forms in effect a stationary dam which uniformly distributes the sulphur over the surface of the shelf and acts as a means to feed sulphur in a uniform film over that portion of the shelf where rapid volatilization takes place.

5. In a process for burning sulphur the method of vaporizing the sulphur which comprises causing molten sulphur at a temperature at which it is viscous to flow continuously down a substantially flat, stationary, slightly sloping surface as a relatively thick, slow-moving mass extending transversely across the slope of said surface, applying heat to the sulphur as it is thus flowing so as to provide a temperature gradient of increasing temperature in the direction of the flow of sulphur such that the farther it flows the hotter it becomes until a point is reached at which it becomes fluent and flows away and is evaporated, the rate of flow of said viscous sulphur as determined by the rate of sulphur feed and the slope of said surface being so correlated with the heating that the lowermost edge of said mass of viscous sulphur remains apparently stationary transversely across the slope of said sloping surface whereby said mass of said viscous molten sulphur acts as a distributing means to feed a thin film of hot fluent sulphur evenly over the surface of said sloping surface in the region of temperatures conducive to quick vaporization.

6. The method of claim 5 in which the sulphur is heated by burning the sulphur vapor in proximity thereto.

7. In apparatus of the class described a sulphur burner comprising a volatilization chamber the bottom of which is defined by a substantially flat sloping hearth inclined to the horizontal at an angle between about 1 and 3 degrees, a combustion chamber in heat transfer relation to said volatilization chamber, means for feeding sulphur to the upper end of said hearth, means for conducting sulphur vapor from said vaporization chamber to said combustion chamber, and means for co-mingling air with said sulphur vapor, said hearth being of sufficient extent in the direction of its slope as to provide for complete vaporization of sulphur therefrom.

8. In apparatus of the class described a sulphur burner comprising a volatilization chamber the bottom of which is inclined to the horizontal at a minor angle and defines the top of a combustion chamber, said hearth having its lowermost edge spaced from a wall of said burner to allow sulphur vapor to pass from the volatilization chamber into the combustion chamber, and means for admitting air to the combustion chamber.

9. In apparatus of the class described a sulphur burner comprising a volatilization chamber the bottom of which is inclined to the horizontal at a minor angle and defines the top of a combustion chamber, said hearth having its lowermost edge spaced from a wall of said burner to allow sulphur vapor to pass from the volatilization chamber into the combustion chamber, and means for admitting air to the combustion chamber, said last named means comprising openings in the wall of said burner opposite the lowermost edge of said hearth and located in said wall adjacent said edge.

ALBERT REGENBRECHT.